United States Patent
Burkhardt

(10) Patent No.: US 6,688,587 B2
(45) Date of Patent: Feb. 10, 2004

(54) METHOD FOR THE ADAPTATION OF A MACHINE SUPPORT

(75) Inventor: Wolfgang Burkhardt, München (DE)

(73) Assignee: Man Nutzfahrzeuge AG (DE)

(*) Notice: Subject to any disclaimer, the term of this patent is extended or adjusted under 35 U.S.C. 154(b) by 0 days.

(21) Appl. No.: 10/096,697

(22) Filed: Mar. 13, 2002

(65) Prior Publication Data

US 2002/0171024 A1 Nov. 21, 2002

(30) Foreign Application Priority Data

Mar. 15, 2001 (DE) .......................... 101 12 477

(51) Int. Cl.[7] ................................. F16M 1/00
(52) U.S. Cl. ................... 267/136; 267/168; 248/637
(58) Field of Search ................... 188/379, 380; 248/562, 566, 577, 578, 606, 619, 624, 637, 646, 660, 669; 267/136, 166, 168

(56) References Cited

U.S. PATENT DOCUMENTS

| 3,794,277 A | * | 2/1974 | Smedley et al. | ............... 248/20 |
| 5,505,282 A | * | 4/1996 | Olgac | .......................... 188/379 |
| 5,564,537 A | * | 10/1996 | Shoureshi | ................... 188/380 |
| 6,059,274 A | * | 5/2000 | Owen et al. | ................. 267/136 |

* cited by examiner

Primary Examiner—Christopher P. Schwartz
(74) Attorney, Agent, or Firm—R W Becker & Associates; R W Becker

(57) ABSTRACT

A method is provided for adapting or adjusting a machine support where the weight of the machine is accommodated exclusively by a main support. For a differentiated adaptation of the machine support to secondary forces, such as oscillating inertial forces, at least one auxiliary module, which is free of the weight of the machine, is connected in parallel to the main support in such a way that as a consequence of the spring rigidity of the auxiliary module, a spring system combination of the main support and of the auxiliary module corresponds to prescribed characteristics of dampening and inherent frequency.

5 Claims, 1 Drawing Sheet

METHOD FOR THE ADAPTATION OF A MACHINE SUPPORT

BACKGROUND OF THE INVENTION

The present invention relates to a method for the adaptation or adjustment of a machine support where the weight of a machine is accommodated exclusively by a main support.

The setting up and hence connection of machines with the machine foundation or bedplate is customarily effected by means of one or more elastic machine supports. This is particularly true of machines having oscillating masses, such as reciprocating piston or internal combustion engines.

The design of such machine supports with regard to the spring rigidity and dampening is effected in a preliminary step by an analytical determination with regard to weight, moments of inertia, and dominant excitation frequencies.

However, if the machine is connected with other components, such as gear mechanisms and generators, a purely theoretical design of the machine support for achieving an adequately quiet running is not sufficient. In addition, limiting conditions that cannot be controlled, such as external forces (propeller thrust with drives of ships) make an adequately precise definition of the machine support possible to only a limited extent.

Thus, with the initial manufacture of a machine configuration that had up to then been unknown requires monitoring the selected machine support during operation.

Under these conditions, it is often necessary to adapt the machine support at the site of operation, mainly by exchanging it for a machine support having a different rigidity. This is, of course, connected with a considerable expense and effort for modification, since for the known configurations of the machine support the engine must be removed to accomplish such exchange and must subsequently be again placed in position. For example, in the case of drive mechanisms for ship engines, which have very confined installation conditions, this can be an extremely tedious undertaking.

It is therefore an object of the present invention to avoid this effort to a large extent, as well as to provide the possibility for a modification in operation. In addition, it should be possible to achieve an extensive optimization without complicated measuring apparatus and corresponding operators.

BRIEF DESCRIPTION OF THE DRAWINGS

These and other objects and advantages of the present invention will appear more clearly from the following specification in conjunction with the accompanying schematic drawings in which, for explaining the inventive method.

SUMMARY OF THE INVENTION

For a differentiated adaptation of the machine support to secondary forces, such as oscillating inertial forces, pursuant to the inventive method at least one auxiliary module, which is relieved or free of the weight of the machine, is connected in parallel to the main support in such a way that as a consequence of the spring rigidity of the auxiliary module, the spring system combination of the main support and of the auxiliary module corresponds to prescribed characteristics of dampening and inherent frequency.

Due to the fact that the main support is designed only for accommodating the weights, one can freely select the spring rigidity of the auxiliary module in such a way that desired characteristics with regard to dampening and inherent frequency are achieved.

Pursuant to a further development of the inventive method, as a consequence of the spring rigidity of the auxiliary module characteristics of dampening and inherent frequency that are a function of direction can be established.

Spring characteristics of the auxiliary module can be adapted or adjusted not only in one direction, for example the vertical, but also in the two directions that are at right angles thereto.

Further specific features of the present invention will be described in detail subsequently.

DESCRIPTION OF PREFERRED EMBODIMENTS

Figure 1:
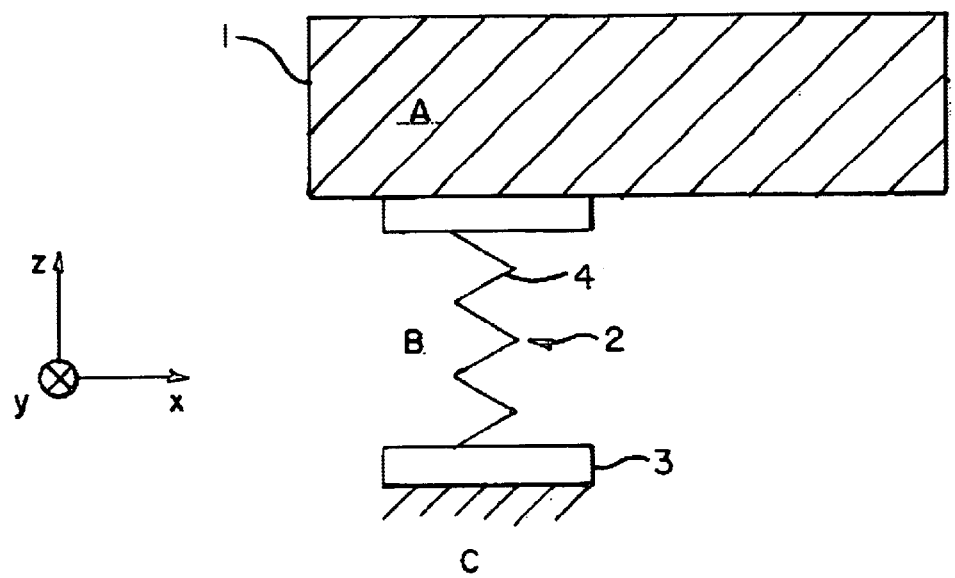
FIG. 1 shows a machine support having a main support.

Referring now to the drawings in detail, FIG. 1 shows a machine 1 that is supported on a machine foundation or bedplate 3 via a machine support. The machine support, here in the function of a main bearing or support 2, is formed from a spring 4 having a rigidity $C_{1Z}$.

The coordinate system is established by the orthogonal coordinates x, y, z. The z coordinate is the vertical direction in which the weight of the machine 1 acts.

The rigidity $C_{1Z}$ of the spring 4 is adapted to the weight and is relatively soft.

With machines 1 having oscillating masses, such as, for example, with internal combustion engines, it is, however, in order to avoid resonance, necessary to adapt the rigidity of the spring 4 to the vibration behavior that is encountered during operation. Oscillating inertial forces are effective as excitation forces. Purely rotating masses can be compensated for by counter masses.

Figure 2:
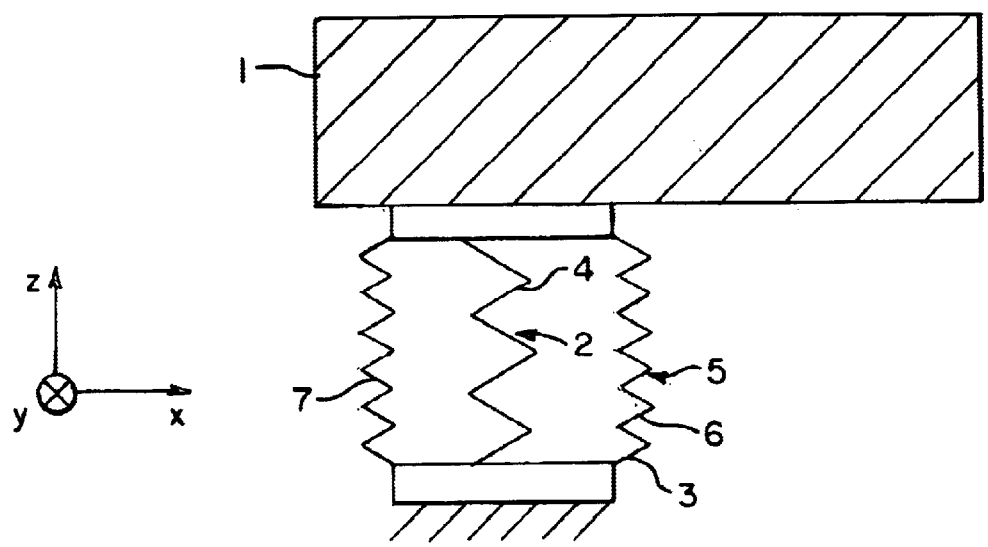
FIG. 2 shows a machine support having a main support and an auxiliary module that is connected in parallel thereto.

Pursuant to the embodiment illustrated in FIG. 2, inventively connected in parallel with the spring 4 of the main support 2 is at least one auxiliary module 5 in the form of a second spring 6. During installation, this second spring 6 is relieved of any weight of the machine 1, i.e. the second spring 6 is installed only after the inward deflection of the spring 4 into the intermediate space that remains between the machine 1 and the machine bedplate 3.

Without regard to the stressing from weight, the rigidity $C_{2Z}$ of the second spring 6 can be provided merely on the basis of desired inherent frequency of the oscillating system that is formed from the mass m of the machine 1 and the rigidities $C_{1Z}+C_{2Z}$. The inherent frequency can be varied by the selection of the rigidity $C_{2Z}$ such that damaging resonance is avoided.

It is to be understood that the auxiliary module 5 can also be formed by a plurality of springs, for example by including a third spring 7 having a rigidity $C_{3Z}$, with this spring being connected in parallel with the main support 2.

The use of the inventive auxiliary module 5 also allows influencing of rigidity in the x and y directions.

The rigidities of the system formed from the main support 2 and the auxiliary module 5 result as follows:

$$C_x = C_{1x} + C_{2x} + C_{3x}$$

$$C_y = C_{1y} + C_{2y} + C_{3y}$$

$$C_z = C_{1z} + C_{2z} + C_{3z}$$

| Where: | $C_1$ | Rigidity of the Spring 4 | (Main Support 2) |
|---|---|---|---|
| | $C_2$ | Rigidity of the Spring 6 | |
| | $C_3$ | Rigidity of the Spring 7 | |

The indices x, y, z indicate the direction of the rigidity.

With minimal assembly effort, the inventive method makes it possible to adapt the machine support of an already installed machine or engine, without having to remove the machine. This is particularly advantageous with internal combustion engines that serve for driving a boat or similar vessel. Since in such situations very small installation conditions exist, the inventive method is assembly friendly, especially since it is not necessary to undertake any readjustment of the system.

The specification incorporates by reference the disclosure of German priority document 101 12 477.5 filed Mar. 15, 2001.

The present invention is, of course, in no way restricted to the specific disclosure of the specification and drawings, but also encompasses any modifications within the scope of the appended claims.

I claim:

1. A method for an adaptation or adjustment of a machine support where the weight of the machine is accommodated exclusively by a main support, the main support being resilient deflectable in response to secondary forces different than the static force of the machine, said method including the step of:

for a differentiated adaptation of said machine support to secondary forces, including oscillating inertial forces, connecting at least one auxiliary module, which is free of the weight of the machine, in parallel to said main support in such a way that as a consequence of the spring rigidity of said auxiliary module, a spring system combination of said resilient main support and of said auxiliary module corresponds to prescribed characteristics of dampening and inherent frequency.

2. A method according to claim 1, which includes the step of establishing characteristics of dampening and inherent frequency that are a function of direction via said spring rigidity of said auxiliary module.

3. An apparatus for at least partially dampening the secondary forces to which a machine support supporting a machine is subjected, the weight of the machine being substantially exclusively accommodated by a main support, the apparatus comprising:

at least one auxiliary module which is substantially free of the weight of the machine due to the support thereof of the main support, said auxiliary module being mounted in parallel to said main support in a configuration such that, in response to secondary forces applied through the machine support, said main support resiliently deflects contemporaneously with resilient deflection of said one auxiliary module with said main support and said one auxiliary module together forming a spring system combination which corresponds to prescribed characteristics of dampening and inherent frequency, whereupon a differentiated adaptation of said machine support to secondary forces, including oscillating inertial forces, is provided.

4. A method for an adaptation or adjustment of a machine support where the weight of the machine is accommodated exclusively by a resilient main support, said method including the step of:

connecting at least one auxiliary module, which is free of the weight of the machine, in parallel to said main support in a configuration such that, in response to secondary forces applied through the machine support, said main support resiliently deflects contemporaneously with resilient deflection of said one auxiliary module with said main support and said one auxiliary module together forming a spring system combination which corresponds to prescribed characteristics of dampening and inherent frequency, whereupon a differentiated adaptation of said machine support to secondary forces, including oscillating inertial forces, is provided.

5. A method according to claim 4, which includes the step of establishing characteristics of dampening and inherent frequency that are a function of direction via said spring rigidity of said auxiliary module.

* * * * *

UNITED STATES PATENT AND TRADEMARK OFFICE
CERTIFICATE OF CORRECTION

PATENT NO. : 6,688,587 B2  Page 1 of 1
DATED : February 10, 2004
INVENTOR(S) : Burkhardt It is certified that error appears in the above-identified patent and that said Letters Patent is hereby corrected as shown below:

<u>Title page,</u>
Item [*] Notice, should read as follows:
-- [*]   Notice: Subject to any disclaimer, the term of this patent is extended or adjusted under 35 U.S.C. 154(b) by 9 days. --

Signed and Sealed this

Sixth Day of April, 2004

JON W. DUDAS
*Acting Director of the United States Patent and Trademark Office*